(12) United States Patent
Hicks (10) Patent No.: US 9,134,903 B2
(45) Date of Patent: Sep. 15, 2015

(54) CONTENT SELECTING TECHNIQUE FOR TOUCH SCREEN UI

(71) Applicant: barnesandnoble.com llc, New York, NY (US)

(72) Inventor: Kourtny M. Hicks, Sunnyvale, CA (US)

(73) Assignee: Barnes & Noble College Booksellers, LLC, Basking Ridge, NJ (US)

( * ) Notice: Subject to any disclaimer, the term of this patent is extended or adjusted under 35 U.S.C. 154(b) by 208 days.

(21) Appl. No.: 13/715,376

(22) Filed: Dec. 14, 2012

(65) Prior Publication Data

US 2014/0173473 A1   Jun. 19, 2014

(51) Int. Cl.
*G06F 3/048* (2013.01)
*G06F 3/0488* (2013.01)
*G06F 3/0484* (2013.01)

(52) U.S. Cl.
CPC ........ *G06F 3/04883* (2013.01); *G06F 3/04842* (2013.01)

(58) Field of Classification Search
CPC .... G06F 3/048; G06F 3/0488; G06F 3/04883
USPC .......................................................... 715/764
See application file for complete search history.

(56) References Cited

U.S. PATENT DOCUMENTS

| 4,896,543 | A |   | 1/1990 | Gullman |
|---|---|---|---|---|
| 4,951,233 | A | * | 8/1990 | Fujiwara et al. ............. 715/209 |
| 5,633,471 | A |   | 5/1997 | Fukushima |
| 5,844,557 | A |   | 12/1998 | Shively, II |
| 6,259,438 | B1 |   | 7/2001 | Fleck et al. |
| 6,956,564 | B1 |   | 10/2005 | Williams |
| 7,649,524 | B2 |   | 1/2010 | Haim et al. |
| 7,840,912 | B2 |   | 11/2010 | Elias et al. |
| 7,877,685 | B2 | * | 1/2011 | Peters ........................... 715/272 |
| 7,898,541 | B2 |   | 3/2011 | Hong et al. |
| RE42,738 | E |   | 9/2011 | Williams |
| 8,059,101 | B2 |   | 11/2011 | Westerman et al. |

(Continued)

FOREIGN PATENT DOCUMENTS

EP         0722150 A1     7/1996

OTHER PUBLICATIONS wiki.logos.com, "Print/Export", Nov. 25, 2010, http://wiki.logos.com/Print$2fExport.*

(Continued)

*Primary Examiner* — William Bashore
*Assistant Examiner* — Daniel Rodriguez
(74) *Attorney, Agent, or Firm* — Finch & Maloney PLLC (57) ABSTRACT

Techniques are disclosed for providing a content selecting mode in electronic touch sensitive devices. The content may be, for instance, text, photos, and/or other consumable content. The user can engage the mode with a gesture that includes a combination of contact points on the touch sensitive surface that identifies the content selecting mode is desired. The combination may include, for example, a first contact point at a starting location in the content, and a second contact point at an end location in the content to be selected. Upon receiving the second contact point, the content between the first and second contact points is selected. The selection may be traverse section breaks, column breaks, and page breaks as needed, depending on the placement of the contact points. Intervening navigation gestures such as scrolling or paging swipes between the two contact points can be used to locate the desired end location.

19 Claims, 8 Drawing Sheets

(56) References Cited

U.S. PATENT DOCUMENTS

| | | | |
|---|---|---|---|
| 8,239,413 | B2 | 8/2012 | Hubert |
| 8,274,536 | B2 | 9/2012 | Chaudhri et al. |
| 8,286,104 | B1 | 10/2012 | Yonge-Mallo |
| D670,713 | S | 11/2012 | Cranfill et al. |
| RE44,103 | E | 3/2013 | Williams |
| 8,400,417 | B2 | 3/2013 | Ording et al. |
| 8,508,494 | B2 | 8/2013 | Moore |
| 2001/0025289 | A1 | 9/2001 | Jenkins et al. |
| 2002/0116421 | A1 | 8/2002 | Fox et al. |
| 2007/0047002 | A1 | 3/2007 | Hull et al. |
| 2008/0036747 | A1 | 2/2008 | Hope |
| 2009/0109182 | A1* | 4/2009 | Fyke et al. ............... 345/173 |
| 2010/0100854 | A1 | 4/2010 | Russell et al. |
| 2010/0192086 | A1 | 7/2010 | Kocienda et al. |
| 2010/0229130 | A1 | 9/2010 | Edge et al. |
| 2010/0259482 | A1 | 10/2010 | Ball |
| 2010/0262659 | A1 | 10/2010 | Christiansen et al. |
| 2010/0318895 | A1 | 12/2010 | Steinberger et al. |
| 2011/0258542 | A1 | 10/2011 | Kenney et al. |
| 2011/0310026 | A1* | 12/2011 | Davis et al. ............... 345/173 |
| 2012/0056821 | A1 | 3/2012 | Goh |
| 2012/0127110 | A1 | 5/2012 | Amm et al. |
| 2012/0139879 | A1 | 6/2012 | Kim et al. |
| 2012/0221938 | A1 | 8/2012 | Patterson et al. |
| 2012/0229397 | A1* | 9/2012 | Cho et al. ............... 345/173 |
| 2012/0235901 | A1 | 9/2012 | Binder |
| 2012/0240074 | A1* | 9/2012 | Migos et al. ............ 715/776 |
| 2012/0242579 | A1 | 9/2012 | Chua |
| 2012/0242584 | A1 | 9/2012 | Tuli |
| 2012/0249595 | A1* | 10/2012 | Feinstein ............... 345/642 |
| 2012/0249768 | A1 | 10/2012 | Binder |
| 2012/0280947 | A1 | 11/2012 | Weaver et al. |
| 2012/0311438 | A1 | 12/2012 | Cranfill et al. |
| 2012/0316776 | A1* | 12/2012 | Brown ............... 701/428 |
| 2012/0329529 | A1 | 12/2012 | van der Raadt |
| 2013/0016045 | A1 | 1/2013 | Zhao et al. |
| 2013/0031472 | A1* | 1/2013 | Ueno et al. ............... 715/251 |
| 2013/0036383 | A1 | 2/2013 | Yuan et al. |
| 2013/0063364 | A1 | 3/2013 | Moore |
| 2013/0076632 | A1 | 3/2013 | Sirpal et al. |
| 2013/0076637 | A1 | 3/2013 | Teltz |
| 2013/0076638 | A1 | 3/2013 | Sirpal et al. |
| 2013/0076781 | A1 | 3/2013 | Sirpal et al. |
| 2013/0113699 | A1 | 5/2013 | Lim |
| 2013/0120271 | A1 | 5/2013 | Lee et al. |
| 2013/0135234 | A1 | 5/2013 | Hisano et al. |
| 2013/0139078 | A1 | 5/2013 | Chuang et al. |
| 2013/0139107 | A1 | 5/2013 | Jung |
| 2013/0162532 | A1 | 6/2013 | Cheng et al. |
| 2013/0185680 | A1 | 7/2013 | Chaudhri et al. |
| 2013/0194308 | A1 | 8/2013 | Privault et al. |

OTHER PUBLICATIONS

"Adonit Jot Touch (for iPad)," Adonit Jot Touch (for iPad) Review & Rating—PCMag.com; http://www.pcmag.com/article2/0,2817,2411192,00.asp; 6pages, printed from the Internet on Jun. 20, 2013.

Volpe, Joseph, Amazon patents intelligent pen for adding annotations to digital and printed media (updated), posted Mar. 6, 2012 at 5:39PM, http://www.engadget.com/2012/03/06/amazon-patents-intelligent-pen/, 3 pages, printed from the Internet on Jun. 20, 2013.

"Apple Secretly Filed Three Dynamic Smart Pen Patents in Europe that are Chock Full of Cool Ideas," http://www.patentlyapple.com/patently-apple/2013/02/apple-secretly-filed-three-dynamic-smart-pen-patents-in-europe-that-are-chock-full-of-cool-ideas.html, originally published Feb. 28, 2013, 13 pages, printed from the Internet on Aug. 13, 2013.

"Bamboo Stylus," Wacom Americas, http://www.wacom.com/en/products/stylus, 5 pages, printed from the Internet on Jun. 20, 2013.

Robertson, Adi, "Blue Tiger pressure-sensitive iOS stylus will work over Bluetooth 4.0," http://www.theverge.com/2012/3/7/2851562/blue-tiger-ten-one-design-pressure-sensitive-bluetooth-4-0-stylus, 1 page, printed from the Internet on Aug. 2, 2013.

Malacria, et al., "Clutch-Free Panning and Integrated Pan-Zoom Control on Touch-Sensitive Surfaces: The CycloStar Approach," CHI 2010, Apr. 10-15, 2010, Atlanta, Georgia, USA. Copyright 2010 ACM 978-1-60558-929-9, 10 pages, Sep. 10, 2004.

"Pen," DuoSense Pen, N-trig Hands-on computing, http://www.n-trig.com/Content.aspx?Page=DigitalPencil, 3 pages, printed from the Internet on Jun. 20, 2013.

"Easing functions," Easing Functions Cheat Sheet, http://easings.net/, 3 pages, printed from the Internet on Jun. 17, 2013.

Kirupa, Easing Functions (aka Timing Functions) in CSS3, printed Apr. 3, 2013, kirupa.com, http://www.kirupa.com/html5/easing_functions_css3.htm, 16 pages, printed from the Internet on Jun. 18, 2013.

"EMR (Electro-Magnetic Resonance) Technology—The De Facto Standard for Pen Tablet Devices is Realized using EMR Technology," Wacom Components : Input Technology : EMR Technology, http://wacom-components.com/english/technology/emr.html, 5 pages, printed from the Internet on Aug. 2, 2013.

"Simultaneous Pen & Touch: The Natural Way to Work," Perceptive Pixel Active Stylus, www.perceptivepixel.com/_literature_136086/Active_Stylus, 2 pages, printed from the Internet on Dec. 14, 2012.

"Future Apple Notebooks & Tablets may use Acoustic Commands—Patently Apple," originally published Feb. 18, 2011, http://www.patentlyapple.com/patently-apple/2011/02/future-apple-notebooks-tablets-may,6 pages, printed from the Internet on Nov. 3, 2012.

"Guidelines for selecting text and images (Windows Store apps)," http://msdn.microsoft.com/en-us/library/windows/apps/hh465334, 5 pages, printed from the Internet on Jun. 20, 2013.

Lutz, Zachary, "Hands-on with wireless, ultrasonic stylus an touchless gestures at MWC (video)," posted Mar. 1, 2012 at 8:28 AM, http://www.engadget.com/2012/03/01/hands-on-with-wireless-ultrasonic-stylus-and-touchl, 3 pages, printed from the Internet on Jun. 20, 2013.

"HEX3 JaJa Pressure Sensitive Stylus," HEX3 JaJa Pressure Sensitive Stylus Review & Rating—PCMag.com, http://www.pcmag.com/article2/0,2817,2411194,00.asp, 6 pages, printed from the Internet on Jun. 20, 2013.

"How do WACOM tablets work?," tablet4u.co.uk, http://www.tablet4u.co.uk/techinfo.html, 2 pages, printed from the Internet on Jun. 20, 2013.

Kim, Arnold, "Multi-Touch Page Flipping eBook Concept Shown on an iPad," posted Jan. 22, 2012 at 10:52pm PST, MacRumors—news and rumors you care about, http://www.macrumors.com/2012/01/23/multi-touch-page-flipping-ebook-concept-shown-6 pages, printed from the Internet on Nov. 3, 2012.

"Desktop Touchscreens,"—Desktop touchscreens explained, http://www.touchscreenmagazine.nl/touchscreen-solutions/desktop-touchscreens, 1 page, printed from the Internet on Nov. 3, 2012.

"MTStylus Wireless Stereo Stylus for iPhone/Andriod Phone & Tablet," dexim-MTStylus Wireless Stereo Stylus, http://www.dexim.net/content.php?id=165&pid=11, 2 pages, printed from the Internet on Jun. 20, 2013.

"Padblue 2," BRANDO—mobile.brando.com, http://mobile.brando.com/Padblue-2_p9162c1577d94.html., 4 pages, printed from the Internet on May 10, 2013.

Fingas, Jon, "Panasonic mobile devices to use Anoto's pattern-based pen input technology," posted Jan. 8, 2013 at 1:00PM, http://www.engadget.com/2013/01/08/panasonic-mobile-devices-to-use-anoto-pattern-pen-, 4 pages, printed from the Internet on Jun. 20, 2013.

"Bluetooth 4.0 SmartPen The future just got a little brighter," Pogo Connect, http://tenonedesign.com/connect.php, 7 pages, printed from the Internet on Jun. 20, 2013.

Quick, Darren, "Pressure sensitive technology set to bring 3D capability to touchscreens," posted on Jan. 31, 2010, Mobile Technology, http://www.gizmag.com/new-touchscreen-technology, 4 pages, printed from the Internet on Aug. 2, 2013.

Rigg, Jamie, "Sony tries to patent stylus with friction-based haptic feedback," posted on Nov. 22, 2012 at 9:50 AM, http://www.engadget.com/2012/11/22/sony-haptic-feedback-stylus-patent/, 2 pages, printed from the Internet on Jun. 20, 2013.

"Stylus Hanging Bluetooth Headset," BRANDO—mobile.brando.com, http://mobile.brando.com/prod_detail.php?prod_id=03291, 4 pages, printed from the Internet on May 10, 2013.

(56) References Cited

OTHER PUBLICATIONS

"The JukeStyle is a great budget stylus for your iOS devices," stylus Archives_iPad News, http://www.ipadnews.nl/tag/stylus/, 44 pages, printed from the Internet on Jun. 20, 2013.

Lavrinc, Damon, "Why Flipping Through Paper-Like Pages Endures in the Digital World," originally posted on May 11, 2012 at 3:48PM, Gadget Lab, http://www.wired.com/gadgetlab/2012/05/why-flipping-through-paper-like-pages-endures-in-the-digital-world/, 5 pages, printed from the Internet on May 6, 2013.

Bragdon, et al., "Experimental Analysis of Touch-Screen Gesture Designs in Mobile Environments", Proceedings of the SIGCHI Conference on Human Factors in Computing Systems, pp. 403-412 (2011).

"Gesture Search for Google Mobile", Google Mobile, www.google.com/mobile/gesture-search, 1 page, printed from the Internet on Dec. 26, 2012.

"Comics by comiXology," Comic Book Reader Guide, http://www.comicbookreaderguide.com/comics-by-comixology/, 24 pages, printed from the Internet on May 6, 2013.

"NFC Forum: Frequently Asked Questions," http://www.nfc-forum.org/resources/faqs#acknowledge, 11 pages, printed from the Internet on Feb. 18, 2013.

"How to Remote Wipe an iPhone or iPad," OSXDaily, http://osxdaily.com/2012/06/05/remote-wipe-iphone-or-ipad/, 4 pages, printed from the Internet on Feb. 2, 2013.

"Screen hotspot," Wikipedia, the free encyclopedia, http://en.wikipedia.org/wiki/Screen_hotspot, 1 page, printed from the Internet on May 15, 2013.

"PAiA-Touch Switches," PAiA Corporation USA, file:///S:/Client%20Files/Barnes%20&%20Noble/IDS%20Master%20Folder/S&G%20-%2..., 3 pages, printed from the Internet on Aug. 27, 2013.

Kanai, et al., "Intra-Rendition Navigation," Copyright 2012-2013 International Digital Publishing Forum (IDPF), 13 pages.

"Explaining how the sPen tech works (and is very diff than other styluses)," http://forum.xda-developers.com/showthread.php?t=, 1 page, printed from the Internet on Jan. 15, 2013.

\* cited by examiner

Touch Screen Display

Figures 3a-j each illustrates an example multi-touch content selecting mode of an electronic touch screen device, in accordance with an embodiment of the present invention. In some example cases, the content between first and second contact points is highlighted or otherwise selected. The first and second contact points may be, for example, taps or press-and-hold contacts on the touch screen. The selected content may be within a single continuous block of displayed content on a given page, or may traverse section breaks, column breaks, and page breaks as needed, depending on the placement of the first and second contact points. Intervening navigational gestures such as horizontal or vertical swipes can be used between the two contact points to locate the desire end location.

Selected Content (now selected)

Fig. 3c

Touch Screen Display

Figures 3a-j each illustrates an example multi-touch content selecting mode of an electronic touch screen device, in accordance with an embodiment of the present invention. In some example cases, the content between first and second co[...] or otherwise selected [...] contact points ma[...] or press-and-hold contacts on the touch screen. The selected content may be within a single continuous block of displayed content on a given page, or may traverse section breaks, column breaks, and page breaks as needed, depending on the placement of the first and second contact points. Intervening navigational gestures such as horizontal or vertical swipes can be used between the two contact points to locate the desire end location.

Selection Action Menu
Copy / Cut / Paste / Format
Exit

Selected Content (now selected)

Pop-up Menu

CONTENT SELECTING TECHNIQUE FOR TOUCH SCREEN UI

FIELD OF THE DISCLOSURE

This disclosure relates to electronic display devices, and more particularly, to user interface (UI) techniques for interacting with touch screen devices.

BACKGROUND

Electronic display devices such as tablets, eReaders, mobile phones, smart phones, personal digital assistants (PDAs), and other such touch screen electronic display devices are commonly used for displaying consumable content. The content may be, for example, an eBook, an online article or blog, images, a movie or video, a map, just to name a few types. Such display devices are also useful for displaying a user interface that allows a user to interact with an application running on the device. The user interface may include, for example, one or more touch screen controls and/or one or more displayed labels that correspond to nearby hardware buttons. The touch screen display may be backlit or not, and may be implemented for instance with an LED screen or an electrophoretic display. Such devices may also include other touch sensitive surfaces, such as a track pad (e.g., capacitive or resistive touch sensor) or touch sensitive housing (e.g., acoustic sensor).

BRIEF DESCRIPTION OF THE DRAWINGS

FIGS. 3a-c illustrate an example content selecting mode of an electronic touch screen device, in accordance with an embodiment of the present invention.

FIG. 3c' illustrates an example content selecting mode of an electronic touch screen device, in accordance with another embodiment of the present invention.

DETAILED DESCRIPTION

Techniques are disclosed for providing a content selecting mode in electronic touch screen devices. The content may be, for instance, text, graphics, images, files, and/or other consumable content. The user can engage the mode with a gesture that includes a combination of contact points on the touch screen that identifies the content selecting mode is desired. The combination may include, for example, a first contact point at a desired starting location in the content, and a second contact point at a desired end location in the content. Upon receiving the second contact point (or release thereof), the content between the first and second contact points is automatically highlighted or otherwise selected. The selection may be traverse section breaks, column breaks, and page breaks as needed, depending on the placement of the first and second contact points. Intervening navigation gestures between the first and second contact points can be used to locate the desired end location and/or to navigate through the selection, if so desired.

General Overview

As previously explained, electronic display devices such as tablets, eReaders, and smart phones are commonly used for displaying user interfaces and consumable content. The user of such devices can typically consume the displayed content with relative ease. In some instances, the user may wish to select a portion of the given content for the purpose of copying that portion to a so-called clip board so that it can subsequently be pasted into another document. While available content selection techniques are commonly provided with touch screen devices for such purposes, such techniques require the user to drag a handle or other such user interface feature from the start location to the desired end location. Moreover, such drag-based techniques seemingly do not allow for the selection to continue across a page break. In this sense, the user is required to carry out multiple selection actions, depending on the number of pages over which the target content spans.

Thus, and in accordance with an embodiment of the present invention, content selection techniques are disclosed for use in electronic touch screen devices. The content may include, for example, text, graphics, images, folders/files, embedded audio and/or video files, and/or any other consumable content. The user can engage the mode with a gesture that includes a combination of contact points on the touch sensitive display that identifies the content selecting mode is desired. The combination may include, for example, a first press-hold-and-release contact point at a desired starting location in the content, and a second press-hold-and-release contact point at a desired end location in the content. Note, however, that press-hold-and-release contacts points are not required, as any suitable contact-types can be used (e.g., tap, circular or elliptical gesture, diagonal gesture, press-hold-and-release, etc, or a combination thereof) to uniquely identify the content selecting mode with two distinct points of contact on the touch screen. Upon receiving the second contact point, the content between the first and second contact points is highlighted or otherwise selected. In this sense, the first and second contact points are like bookends for the selected content, which are generally easier for the user to provide than a dragging gesture to a desired end point. As will be further appreciated, the first and/or second contact points may be singular in nature (with single touch point) or a cluster (with multiple touch points), in accordance with an embodiment. As will be appreciated, the term 'highlighted' as used herein refers to content being selected, and does not necessarily mean that a formatting change to the content has been executed. For instance, content can be selected/highlighted, and then a formatting change (e.g., bolding and/or color) can be executed on that selected content. In this sense, highlighting may refer to, for example, any indication of a content selection, which may or may not include a formatting change.

The selected content may be within a single continuous block of displayed content on a given page, or may traverse section breaks or column breaks within a given page, depending on the placement of the first and second contact points.

Likewise, the selected content may traverse any number of page breaks as needed, depending on the placement of the first and second contact points. In such multi-page selection scenarios, intervening navigational gestures such as horizontal or vertical swipes (or any other suitable navigation gesture that is configured for a particular device that doesn't conflict with selection contact point scheme) can be used to navigate to the desired end location and/or otherwise between the first and second contact points, in some embodiments. As will be appreciated in light of this disclosure, navigating to the desired end location in such a manner is relatively quicker and easier than, for example, dragging a contact point. As will be further appreciated in light of this disclosure, the user may select multiple non-contiguous sections of content if so desired (e.g., select a first section using first and second contact points, then a second section using first and second contact points, etc). In such cases, the selected sections can stay selected until the user affirmatively exits the content selection mode.

In some cases, a piece of content associated with the first contact point can be highlighted or otherwise accentuated, for instance, upon the contact or release of the first contact point. The piece of content may be, for example, a word, graphic, image, file, folder, or other individually selectable (touchable) piece of displayed digital content. Such accentuating can be used to visually inform the user that the first contact point of a content selection action is in place. Subsequently, the contact or release of the second contact point over another piece of content causes the content between the first and second contact points to be selected (which may intuitively also include the first and second pieces of contacted content, but need not if so desired). Note that the second piece of content is different than the first piece of content already highlighted or otherwise selected. Further note that the second piece of content may be logically located either above or below (or to the left or right of) the first piece of content, within the overall given structure of the content. The selecting is respectful of the content structure and natural flow of the consumption path, and only content between (and including) the two contact points is selected, in accordance with some embodiments.

In some cases, the selecting content can be indicated with a color change associated with the selected block, and/or with brackets or handles or virtual bookends or dashed outlining, or with other visual indicators that effectively identify or otherwise accentuate the block of selected content. The user may configure such features, in some embodiments. In other embodiments, such features may be provisioned by default or hard-coded. Any number of such techniques can be used to provide the user with a visual indicator of the selected content, as will be appreciated in light of this disclosure.

Once selected, the user can then operate on the selection, in accordance with some embodiments. For example, the user can execute a copy-and-paste operation (e.g., via control-c and control-p keystrokes, or via 'copy' and 'paste' button presses) so that the selected portion of content is copied to the device clip board so that it can subsequently be pasted into another location/document. Likewise, the user can execute a cut-and-move operation (e.g., via control-x and control-p keystrokes, or via 'cut' and 'paste' button presses) so that the selected portion of content is removed to the device clip board so that it can subsequently be pasted into another location/document. In some such embodiments, copy, cut, and paste UI press-button features can be displayed to the user via the touch screen to facilitate such copying, cutting, and pasting by the user. In another example embodiment, the user can apply a formatting change to the selected portion, such as a change in font or pitch or color with respect to selected text, or a change from color to black-and-white or grayscale with respect to selected images, etc. In another example embodiment, the user can apply a security change to the selected portion, such as a change in access permissions with respect to selected files or folders, etc. In another example embodiment, the user can perform a dictionary look-up or search based on the selected content. In a more general sense, once the content is selected, any number of post-selection actions can then be applied to that selection content. In still other example embodiments, the user may wish to simply highlight the selected portion of content to make it easier to see or find within the document. In any such cases, any number of suitable UI control features (e.g., copy/cut/paste/format UI press-buttons) can be provided to the user, depending on the given context and application in which the user is operating, as well as capabilities of the device. In some embodiments, an 'exit' UI press-button feature can also be displayed (or the equivalent thereof), which the user can tap or otherwise engage to end the content selection operation. Such example UI control features can be displayed automatically to user once the content is selected, in accordance with some embodiments.

Given the global nature and/or uniqueness of the engagement mechanism, in accordance with some embodiments, the content selection mode can be similarly invoked within multiple diverse applications (e.g., eBook, browser, picture viewer, file manager, etc) and without conflicting with other global gestures that might also be used by the device's operating system. While some example embodiments include first and second contact points that are singular in nature, other embodiments may include a different contact point scheme. For instance, the first contact point may actually be two or more simultaneously applied contact points (such as a five-point contact provided by a grouping of a user's four fingers and thumb) over the first piece of content to indicate the beginning of the selected content. The second contact point may similarly include multiple contact points in a cluster over the second piece of content to indicate the end of the selected content. In a more general sense, any uniquely identifiable set of first and second contact points over distinct first and second pieces of displayed content, respectively, can be used to engage the content selecting mode, in accordance with an embodiment of the present invention. The uniqueness of the touch for the first and/or second contact points may be based, for example, on the number of contact points simultaneously provided and/or the nature of the touch (e.g., a quick tap, a press-and-hold for a predetermined duration, a sequence of taps, drags, swipes, circular and/or elliptical gestures, etc). As will be further appreciated, the uniqueness of the touch for the first and/or second contact points may exist, for example, at the global level or the application level.

As will be appreciated in light of this disclosure, note that the first and second contact points may be provided at different points in time, but may also be provided simultaneously (e.g., if selecting a section of content on a single page, but the first and second contact points can be simultaneously provided). The techniques can be implemented in an intuitive manner, so that the user can seamlessly and selectively engage and/or disengage the content selecting mode without disrupting the consumption experience, in accordance with some embodiments. The first and second contact points may be provided by the user's fingers or any suitable implement, such as a stylus.

Architecture and Applications

Figure 1A:
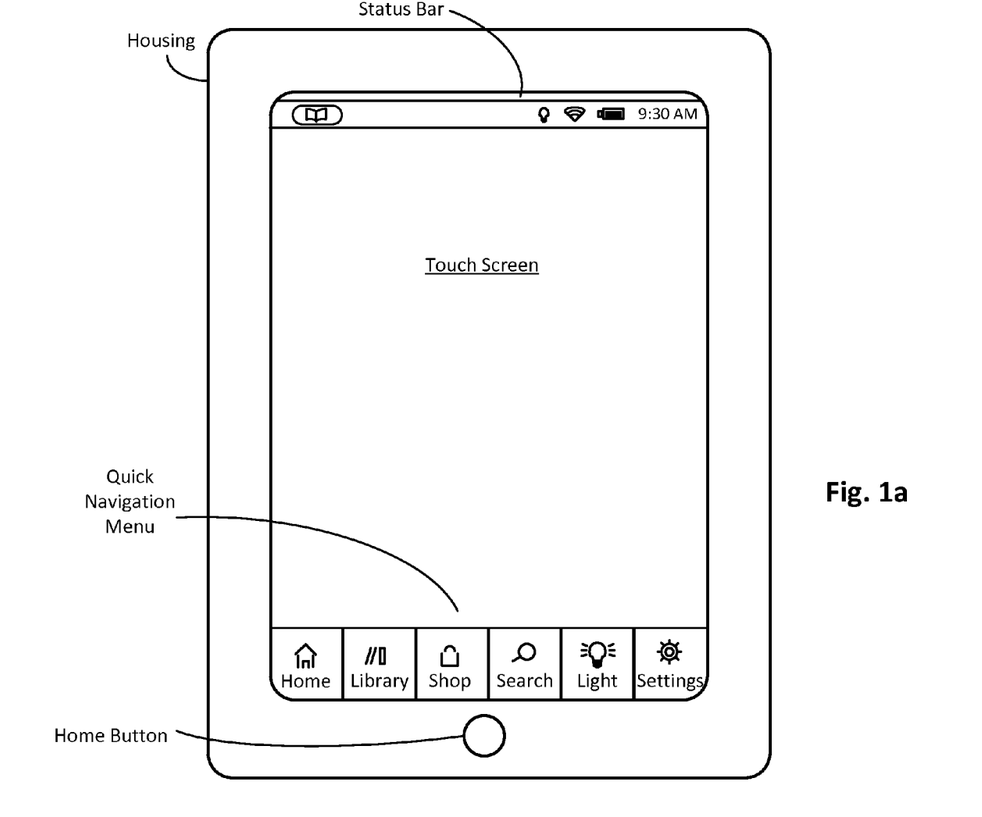
FIGS. 1a-b illustrate an example electronic touch screen device having a content selecting mode configured in accordance with an embodiment of the present invention.
Figure 1B:
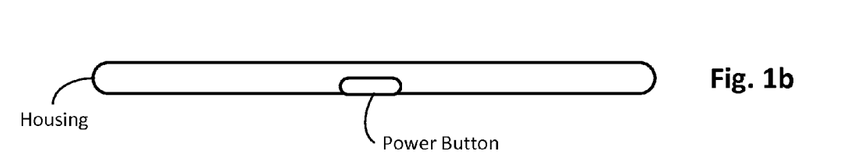

FIGS. 1a-b illustrate an example electronic touch screen device having a content selecting mode configured in accordance with an embodiment of the present invention. The device could be, for example, a tablet such as the NOOK® Tablet or NOOK® eReader by Barnes & Noble. In a more general sense, the device may be any electronic device having a touch screen user interface and capability for displaying content to a user, such as a mobile phone or mobile computing device such as a tablet or laptop, a desktop computing system, a television, a smart display screen, or any other device having a touch screen display. As will be appreciated, the claimed invention is not intended to be limited to any particular kind or type of electronic device.

As can be seen with this example configuration, the device comprises a housing that includes a number of hardware features such as a power button and a press-button (sometimes called a home button herein). A touch screen based user interface is also provided, which in this example embodiment includes a quick navigation menu having six main categories to choose from (Home, Library, Shop, Search, Light, and Settings) and a status bar that includes a number of icons (a night-light icon, a wireless network icon, and a book icon), a battery indicator, and a clock. Other embodiments may have fewer or additional such UI touch screen controls and features, or different UI touch screen controls and features altogether, depending on the target application of the device. Any such general UI controls and features can be implemented using any suitable conventional or custom technology, as will be appreciated.

The power button can be used to turn the device on and off, and may be used in conjunction with a touch-based UI control feature that allows the user to confirm a given power transition action request (e.g., such as a slide bar or tap point graphic to turn power off). In this example configuration, the home button is a physical press-button that can be used as follows: when the device is awake and in use, tapping the button will display the quick navigation menu, which is a toolbar that provides quick access to various features of the device. The home button may also be configured to cease an active function that is currently executing on the device, such as a content selecting mode as described herein. The button may further control other functionality if, for example, the user presses and holds the home button. For instance, an example such push-and-hold function could engage a power conservation routine where the device is put to sleep or an otherwise lower power consumption mode. So, a user could grab the device by the button, press and keep holding as the device was stowed into a bag or purse. One physical gesture that would safely put the device to sleep. Thus, in such an example embodiment, the home button may be associated with and control different and unrelated actions: 1) show the quick navigation menu; 2) exit the content selecting mode, but keep the page being read or otherwise consumed displayed (e.g., so that another mode can be entered, if so desired); and 3) put the device to sleep. Numerous other configurations and variations will be apparent in light of this disclosure, and the claimed invention is not intended to be limited to any particular set of hardware buttons or features, or device form factor.

As can be further seen, the status bar may also include a book icon (upper left corner). In some such cases, the user can access a sub-menu that provides access to a content selecting mode configuration sub-menu by tapping the book icon of the status bar. For example, upon receiving an indication that the user has touched the book icon, the device can then display the multi-touch content selecting mode configuration sub-menu shown in FIG. 1d. In other cases, tapping the book icon just provides bibliographic information on the content being consumed. Another example way for the user to access a content selecting mode configuration sub-menu such as the one shown in FIG. 1d is to tap or otherwise touch the Settings option in the quick navigation menu, which causes the device to display the general sub-menu shown in FIG. 1c. From this general sub-menu the user can select any one of a number of options, including one designated Screen/UI in this specific example case. Selecting this sub-menu item (with an appropriately placed screen tap) may cause the content selecting mode configuration sub-menu of FIG. 1d to be displayed, in accordance with an embodiment. In other example embodiments, selecting the Screen/UI option may present the user with a number of additional sub-options, one of which may include a content selecting mode option, which may then be selected by the user so as to cause the content selecting mode configuration sub-menu of FIG. 1d to be displayed. Any number of such menu schemes and nested hierarchies can be used, as will be appreciated in light of this disclosure.

As will be appreciated, the various UI control features and sub-menus displayed to the user are implemented as UI touch screen controls in this example embodiment. Such UI touch screen controls can be programmed or otherwise configured using any number of conventional or custom technologies. In general, the touch screen translates the user touch in a given location into an electrical signal which is then received and processed by the underlying operating system (OS) and circuitry (processor, etc). Additional example details of the underlying OS and circuitry in accordance with some embodiments will be discussed in turn with reference to FIG. 2a.

Figure 1C:
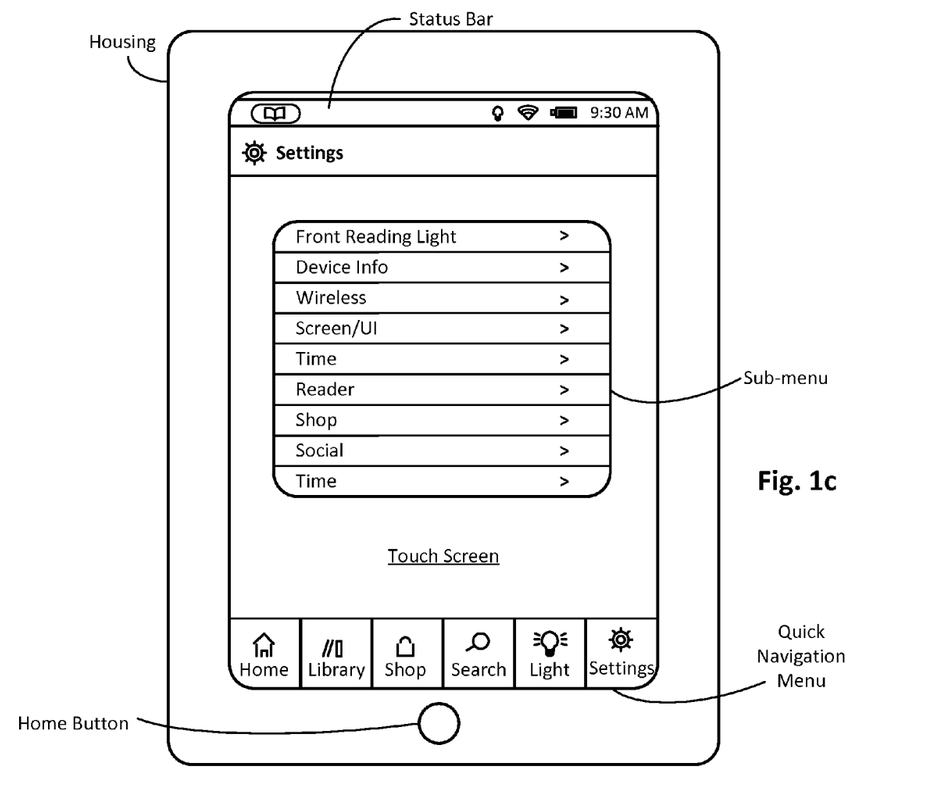
FIGS. 1c-d illustrate example configuration screen shots of the user interface of the electronic touch screen device shown in FIGS. 1a-b, configured in accordance with an embodiment of the present invention.
Figure 1D:
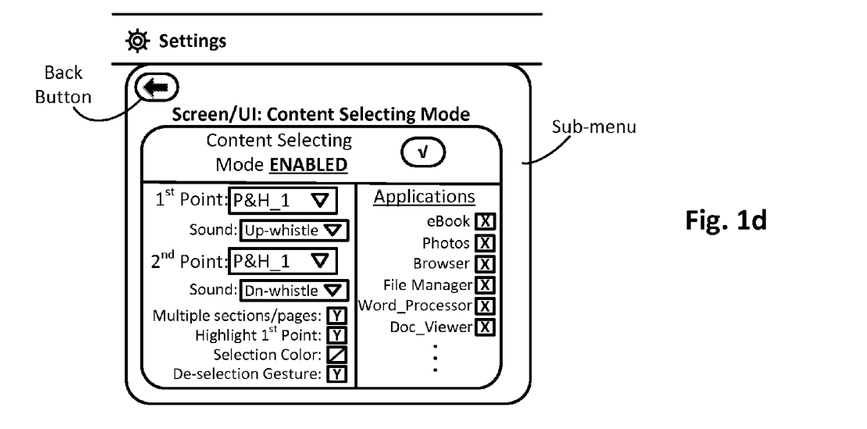

As previously explained, and with further reference to FIGS. 1c and 1d, once the Settings sub-menu is displayed (FIG. 1c), the user can then select the Screen/UI option. In response to such a selection, the content selecting mode configuration sub-menu shown in FIG. 1d can be provided to the user. In this example case, the content selecting mode configuration sub-menu includes a UI check box that when checked or otherwise selected by the user, effectively enables the content selecting mode (shown in the enabled state); unchecking the box disables the mode. Other embodiments may have the content selecting mode always enabled, or enabled by a physical switch or button, for example. The user can configure a number of features with respect to the content selecting mode, in some cases.

In this example embodiment, once the content selecting mode is enabled, the user can choose the type of contact desired for each of the first and second contact points that will effectively bookend the selected. For instance, in the example configuration shown, each of the first second contact points is set via a pull-down menu to be a press-and-hold of a specific duration (P&H_1). An example set of contact choices that can be offered by the first and second point pull-down menus is provided in Table 1. As will be appreciated, numerous variations will

TABLE 1

Example Contact Point Choices

| Choice | Type |
|---|---|
| P&H_1 | Single touch, 1 second press-and-hold, on target piece of content |
| P&H_2 | Single touch, 2 second press-and-hold, on target piece of content |
| Tap_1 | Single touch, <1 second, on target piece of content |
| Tap_2 | Double touch, <1 second, on/about target piece of content |
| Diagonal | Diagonal swipe thru target piece of content |
| Circular | Circle around/thru target piece of content | be apparent in light of this disclosure. The provided contact can be on the target piece of content (tap or press-and-hold), or can pass thru the target piece of content (mini-swipe or rotating gesture), or some other contact that at least partially touches the target piece of content. Press-and-hold gestures (sometimes referred to as press-hold-and-release or touch-hold-and-release) can be provided on the target piece of content for any duration of time (e.g., 1 second, 2 seconds, 3 seconds, . . . , etc) and with any number of touches (e.g., 1 finger, 2 fingers, 3, fingers, . . . , etc). Likewise, a tap gesture on the target piece of content is a relatively quicker touch-and-release (e.g., <1 second) and can also be provided with any number of touches (e.g., 1 finger tap, 2 finger tap, . . . , etc). Likewise, a diagonal gesture is effectively a mini-swipe thru the target piece of content and can also be provided with any number of touches (e.g., 1 finger swipe, 2 finger swipe, . . . , etc). Likewise, a circular gesture can also pass thru the target piece of content and may be provided with any number of touches (e.g., 1 finger, 2 finger, . . . , etc). As will be further appreciated, a multi-touch first contact point may cause not only the target piece of content to be selected, but may also select neighboring content given the broadness of the touch, in some embodiments. In some such embodiments, a multi-touch contact point can be analyzed to identify a centroid of a given multi-touch cluster, and the piece of content closest to that centroid can be initially highlighted or otherwise selected. In some such embodiments, the user can mini-drag the multi-touch cluster over the target piece of content until that target piece of content is selected, and then release that multi-touch cluster to finalize the contact point placement, which could be either the first or second contact point, as will be appreciated in light of this disclosure. Numerous configuration or implementation schemes that allow for a content selection mode that can be globally and/or uniquely activated as needed and without conflicting with other UI touch screen commands/gestures supported by the device will be apparent in light of this disclosure. Another example of user-configurable functionality would be to allow selection of non-contiguous blocks (e.g., via a UI check box or other suitable mechanism), although other embodiments may hard-code such functionality. Further note that styluses or other implements may be used to provide the first and second contact points as well, and the claimed invention is not intended to be limited to any particular manner of causing the various contact points.

As can be further seen with respect to the example embodiment of FIG. 1d, each of the first and second contact points can optionally be associated with a sound effect that is aurally presented, for instance, upon release of the given contact point. For example, in the example configuration shown, an up-whistle sound is provided upon release of the first contact point, and a down-whistle sound is provided upon release of the second contact point. Other embodiments may have no such sound effects, or any number of different sounds effects (e.g., a single tone or chime upon placement of the first contact point and a paper flutter or whoosh sound upon placement of the second contact point).

In the example embodiment of FIG. 1d, the user is further allowed to enable multi-section or multi-page selection operations, by selecting yes (Y) with respect to the 'Multiple sections/pages' UI feature. In other embodiments, such a feature may be enabled by default (i.e., no configuration needed). As can be further seen, the user may also enable highlighting of the first contact point, by selecting yes (Y) with respect to the provisioned 'Highlight $1^{st}$ Point' UI feature. In such cases, the target piece of content will be highlighted or otherwise selected, for example, upon release of the first contact point. In other cases, only a sound effect is given as an indication that the first contact point has been received. In still other embodiments, both aural and visual cues are provided to make that indication. Note, however, that such cues/indications need not be given in all embodiments. Numerous variations and configurations will be apparent in light of this disclosure.

With further reference to the example embodiment of FIG. 1d, the user may also specify a color scheme with respect to the selected content. For instance, the user can select a transparent background color that will effectively encapsulate the selected content, and an opaque background color that will effectively obfuscate the non-selected content. The selected color scheme can be shown in a UI feature such as a divided square as shown (one half is transparent color/one half is opaque color). Other embodiments may automatically apply a given transparent color to the selected content without doing anything to non-selected content, or outline the selected content with a dashed line or other border, for example. Another embodiment may be configured to gray-out or otherwise soften unselected content. Numerous highlighting schemes can be used, and the claimed invention is not intended to be limited to any particular one.

The user may also enable a de-selection gesture by selecting yes (Y) with respect to the 'De-selection Gesture' UI feature. In such cases, the selected content will stay selected until the user executes the de-selection gesture. For example, the user may de-select the selected content by pressing the home button, or tapping the touch screen in a specific area or over the selected content. In another example case, the user may de-select the selected content by executing a more complex specific gesture (which may or may not be user-configurable), such as a counter-clockwise circular gesture with two fingers, or a two finger diagonal swipe having a negative slope (from the upper left to lower right). Other embodiments may deselect the selected content after the user carries out a post-selection action. Numerous such suitable de-selection schemes can be used, and the claimed invention is not intended to be limited to any particular one. As will be further appreciated, such affirmative de-selection enables selection of non-contiguous sections of content, such that selected sections of content stay selected as other sections are subsequently selected as well.

With further reference to the example embodiment of FIG. 1d, the user may also specify a number of applications in which the content selecting mode can be invoked. Such a configuration feature may be helpful, for instance, in a tablet or laptop or other multifunction computing device that can execute different applications (as opposed to a device that is more or less dedicated to a particular application). In this example case, the available applications are provided along with a corresponding check box. Note the diverse nature of the example applications, including an eBook application, a photo viewing application, a browser application, a file manager application, a word processor application, a document viewer application, which are just a few examples. In other embodiments, the content selecting mode can be invoked whenever the first and second content points are provided in the context of displayed content that is selectable, regardless of the application being used. Any number of applications or device functions may benefit from a content selecting mode as provided herein, whether user-configurable or not, and the claimed invention is not intended to be limited to any particular application or set of applications.

As can be further seen, a back button arrow UI control feature may be provisioned on the touch screen for any of the menus provided, so that the user can go back to the previous menu, if so desired. Note that configuration settings provided by the user can be saved automatically (e.g., user input is saved as selections are made or otherwise provided). Alternatively, a save button or other such UI feature can be provisioned, which the user can engage as desired. Again, while FIGS. 1c and d show user configurability, other embodiments may not allow for any such configuration, wherein the various features provided are hard-coded or otherwise provisioned by default. The degree of hard-coding versus user-configurability can vary from one embodiment to the next, and the claimed invention is not intended to be limited to any particular configuration scheme of any kind.

Figure 2A:
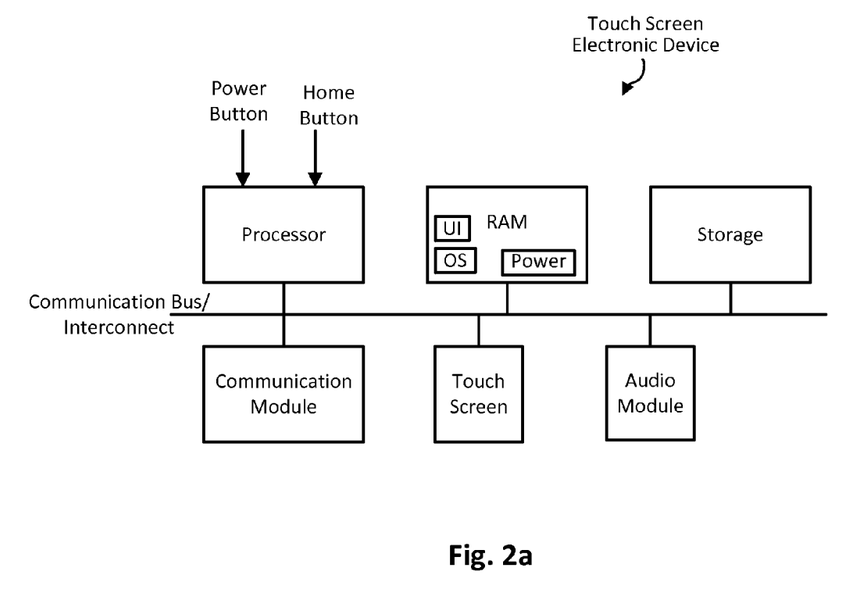
FIG. 2a illustrates a block diagram of an electronic touch screen device configured in accordance with an embodiment of the present invention.

FIG. 2a illustrates a block diagram of an electronic touch screen device configured in accordance with an embodiment of the present invention. As can be seen, this example device includes a processor, random access memory (RAM), additional storage/memory, a communications module, a touch screen, and an audio module. A communications bus and interconnect is also provided to allow inter-device communication. Other typical componentry and functionality not reflected in the block diagram will be apparent (e.g., battery, co-processor, etc). The touch screen and underlying circuitry is capable of translating a user's physical contact with the screen into an electronic signal that can be manipulated or otherwise used to trigger a specific user interface action, such as those provided herein. The principles provided herein equally apply to any such touch sensitive devices. For ease of description, examples are provided with touch screen technology.

In this example embodiment, the RAM includes a number of modules stored therein that can be accessed and executed by the processor (and/or a co-processor). The modules include an operating system (OS), a user interface (UI), and a power conservation routine (Power). The modules can be implemented, for example, in any suitable programming language (e.g., C, C++, objective C, JavaScript, custom or proprietary instruction sets, etc), and encoded on a machine readable medium, that when executed by the processor (and/or co-processors), carries out the functionality of the device including a UI having a content selecting mode as variously described herein. Other embodiments can be implemented, for instance, with gate-level logic or an application-specific integrated circuit (ASIC) or chip set or other such purpose built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

The processor can be any suitable processor (e.g., 800 MHz Texas Instruments OMAP3621 applications processor), and may include one or more co-processors or controllers to assist in device control. In this example case, the processor receives input from the user, including input from or otherwise derived from the power button and the home button. The processor can also have a direct connection to a battery so that it can perform base level tasks even during sleep or low power modes. The RAM can be any suitable type of memory and size (e.g., 256 or 512 Mbytes SDRAM), and in other embodiments may be implemented with non-volatile memory or a combination of non-volatile and volatile memory technologies. The storage can also be implemented with any suitable memory and size (e.g., 2 GBytes of flash memory). The display can be implemented, for example, with a 6-inch E-ink Pearl 800×600 pixel screen with Neonode® zForce® touch-screen, or any other suitable display and touchscreen interface technology. The communications module can be, for instance, any suitable 802.11 b/g/n WLAN chip or chip set, which allows for connection to a local network so that content can be downloaded to the device from a remote location (e.g., content provider, etc, depending on the application of the display device). In some specific example embodiments, the device housing that contains all the various componentry measures about 6.5" high by about 5" wide by about 0.5" thick, and weighs about 6.9 ounces. Any number of suitable form factors can be used, depending on the target application (e.g., laptop, desktop, mobile phone, etc). The device may be smaller, for example, for smartphone and tablet applications and larger for smart computer monitor and laptop applications.

The operating system (OS) module can be implemented with any suitable OS, but in some example embodiments is implemented with Google Android OS or Linux OS or Microsoft OS or Apple OS. As will be appreciated in light of this disclosure, the techniques provided herein can be implemented on any such platforms. The power management (Power) module can be configured as typically done, such as to automatically transition the device to a low power consumption or sleep mode after a period of non-use. A wake-up from that sleep mode can be achieved, for example, by a physical button press and/or a touch screen swipe or other action. The user interface (UI) module can be, for example, based on touchscreen technology and the various example screen shots shown in FIGS. 1a-d and 3a-c', and 4a-e in conjunction with the content selecting mode methodologies demonstrated in FIG. 5, which will be discussed in turn. The audio module can be configured, for example, to speak or otherwise aurally present a selected eBook or other textual content, if preferred by the user. Numerous commercially available text-to-speech modules can be used, such as Verbose text-to-speech software by NCH Software. In such audio-based cases, note that the content selecting techniques as described herein can be used to select the textual content to be converted to audio, for instance. In some example cases, if additional space is desired, for example, to store digital books or other content and media, storage can be expanded via a microSD card or other suitable memory expansion technology (e.g., 32 GBytes, or higher).

Client-Server System

Figure 2B:
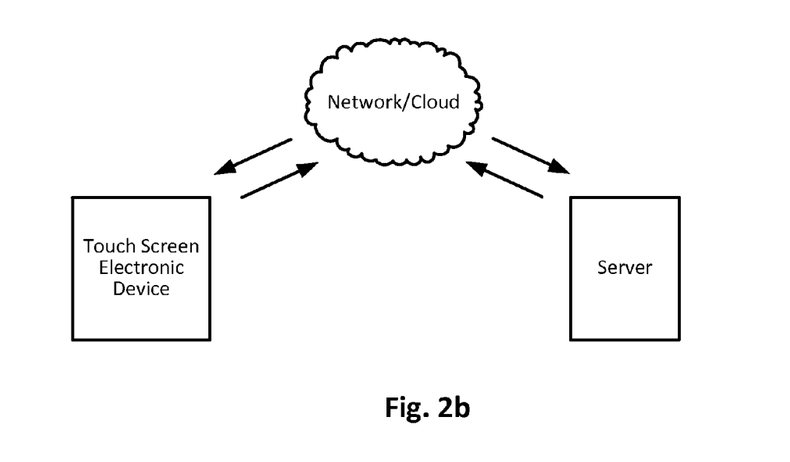
FIG. 2b illustrates a block diagram of a communication system including the electronic touch screen device of FIG. 2b, configured in accordance with an embodiment of the present invention.

FIG. 2b illustrates a block diagram of a communication system configured in accordance with an embodiment of the present invention. As can be seen, the system generally includes an electronic touch screen device (such as the one in FIG. 2a) that is capable of communicating with a server via a network/cloud. In this example embodiment, the electronic touch screen device may be, for example, an eBook reader, a mobile cell phone, a laptop, a tablet, desktop, or any other touch sensitive computing device. The network/cloud may be a public and/or private network, such as a private local area network operatively coupled to a wide area network such as the Internet. In this example embodiment, the server may be programmed or otherwise configured to receive content requests from a user via the touch screen device and to respond to those requests by providing the user with requested or otherwise recommended content. Is some such embodiments, the server is configured to remotely provision a content selecting mode as provided herein to the touch screen device (e.g., via JavaScript or other browser based technology). In other embodiments, portions of the content selecting methodology are executed on the server and other portions of the methodology are executed on the device. Numerous server-side/client-side execution schemes can be implemented to facilitate a content selecting mode in accordance with an embodiment, as will be apparent in light of this disclosure.

Content Select Mode Examples

Figure 3A:
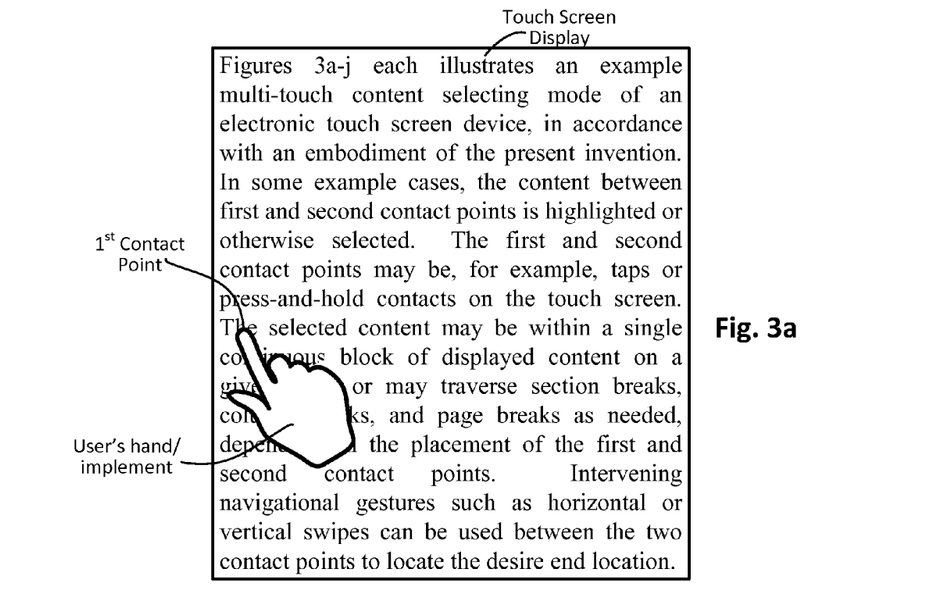
Figure 3B:
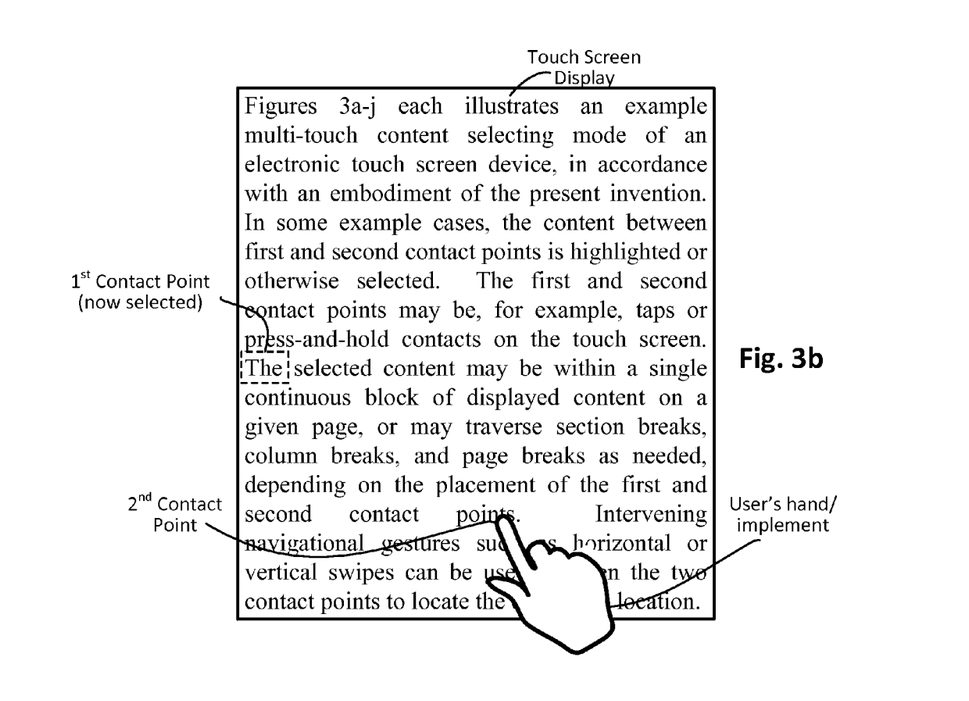

FIGS. 3a-c collectively illustrate an example content selecting mode that can be applied to a touch sensitive display of an electronic device, in accordance with an embodiment of the present invention. In this example case, the targeted content selection is on the same page, and within a continuous block of text. However, as will be appreciated in light of this disclosure, the targeted content selection may span any number of intervening section breaks, chapters, or pages.

In the example embodiment, the user is reading some text but the same techniques can be applied to any type of content, as previously explained. In FIG. 3a, the user is providing the first contact point, where the target piece of content is the word 'The' at the beginning of the fourth sentence shown. In FIG. 3b, the user has released the first contact point and the target piece of content is now selected, as indicated with a dashed border in this example case. In addition, the user is providing the second contact point, where the target piece of content is the word 'points' at the end of the fourth sentence. As can be further seen in the example scenarios of FIGS. 3a-b, the first and second contact points are provided by the user's fingers. Of course, these first and second contact points can be made with other fingers, styluses, or any other implement or body part that can provide the requisite impact on the touch sensitive screen.

Upon release of the second contact point, the target selection between (and including) the first and second contact points is highlighted or otherwise indicated with a dashed box, as shown in FIG. 3c. As previously explained, other highlighting schemes may be used as well. FIG. 3c' shows a result similar to FIG. 3c, except that a pop-up menu is provided automatically upon release of the second contact point. As can be seen, this optional pop-up menu provides a Selection Action Menu that includes a number of relevant actions that the user might wish to execute or otherwise carry out on the selected/highlighted content. The actions in this example case include Copy, Cut, Paste, and Format operations, as well as an Exit to conclude the content selecting mode on that particular section. Each of these actions was previously explained, and that description is equally applicable here.

FIGS. 4a-e collectively illustrate an example content selecting mode that can be applied to a touch sensitive display of an electronic device, in accordance with an embodiment of the present invention. In this example case, the targeted content selection spans across three pages. The previous discussion with respect to type of content being selected, the manner in which contact points are provided, highlighting schemes, optional pop-up menus to facilitate user post-selection actions, and other such commonalities, is equally applicable here as will be apparent.

Figure 4A:
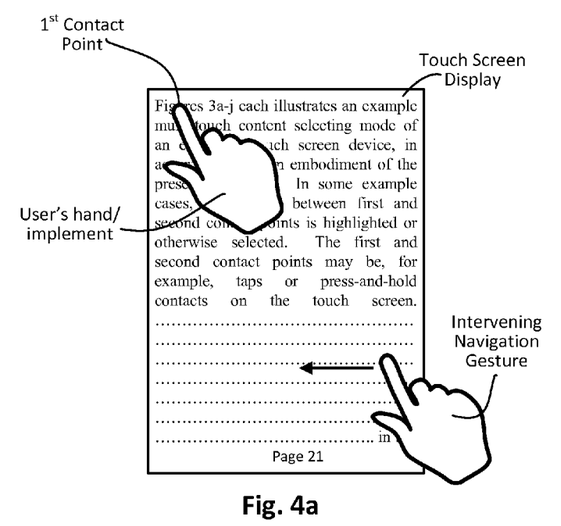
FIGS. 4a-e illustrate an example content selecting mode of an electronic touch screen device, in accordance with another embodiment of the present invention.
Figure 4B:
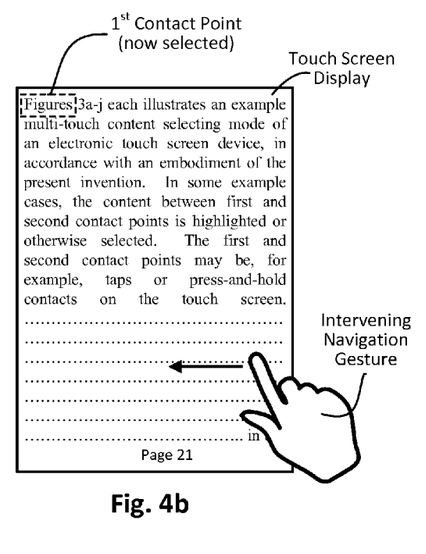
Figure 4C:
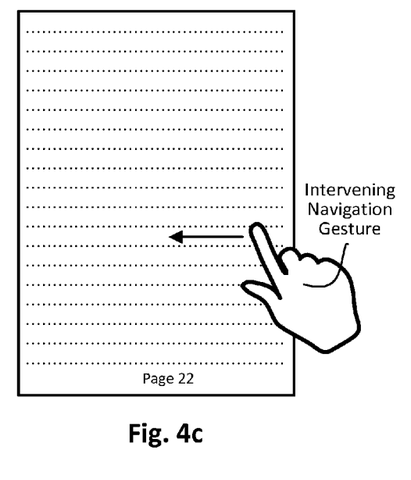
Figure 4D:
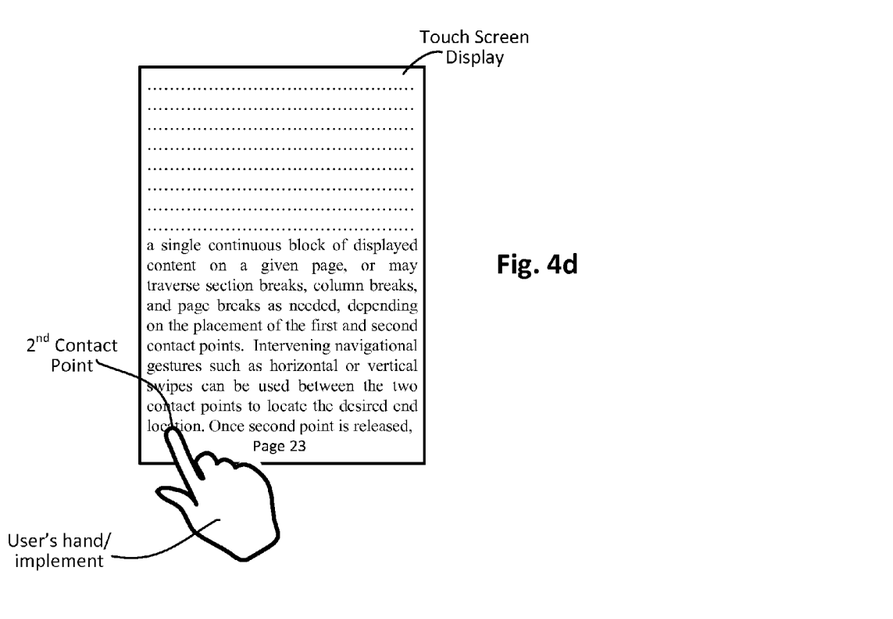

In FIG. 4a, the user is providing the first contact point, where the target piece of content is the word 'Figures' at the beginning of the first sentence shown on page 21. In FIG. 4b, the user has released the first contact point and the target piece of content is now selected, as indicated with a dashed border in this example case. In addition, the user is providing a navigation gesture to page forward, which includes a horizontal swipe from right to left, which is a similar gesture the user might make if turning the page of a real book or hardcopy. FIG. 4c simply shows the next page (page 22 in this example), as well as another navigation gesture by the user, so as to advance to page 23. FIG. 4d shows the user providing the second contact point, where the target piece of content is the word 'location' at the end of the last full sentence on page 23.

Figure 4E:
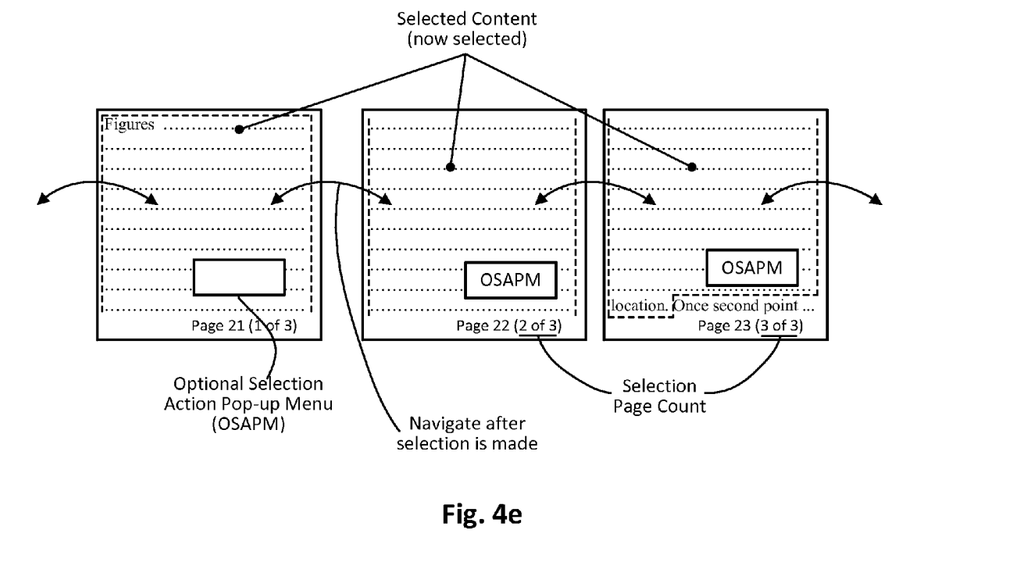

Upon release of the second contact point, the target selection between (and including) the first and second contact points is highlighted/selected with a dashed box, as shown in FIG. 4e. FIG. 4e also shows an optional Selection Action Pop-up Menu (OSAPM) that is provided automatically upon release of the second contact point, on each of the three pages involved in the user's selection.

As can be seen with further reference to FIG. 4e, the user may navigate back and forth while the selection remains selected, in this example embodiment, which may provide a reading guide for the user. In one such embodiment, for instance, a teacher may assign a portion of a given digital text book. The teacher or the teacher's student can thus select that assigned section as described herein so that the student knows when to stop reading. To this end, and in accordance with an embodiment of the present invention, further note with respect to FIG. 4e that upon release of the second content point, not only is the target content selection identified but a 'Selection Page Count' UI feature (e.g., '(1 of 3)', '(2 of 3)', '(3 of 3)') is also displayed to the user so as to inform the user of the page numbers assigned to the multi-page content selection as well as how much more of the selected content remains from each given page. Once the student has finished the reading assignment, the selecting mode can be exited. Such a content selection and page numbering scheme may be useful in a number of other scenarios, as will be appreciated in light of this disclosure. Recall that in some example scenarios, there may be selections of non-contiguous sections or blocks of content that were selected in a sequential and/or random fashion by the user using first and second touch and release contact points bookending each section/block as provided herein.

Methodology

Figure 5:
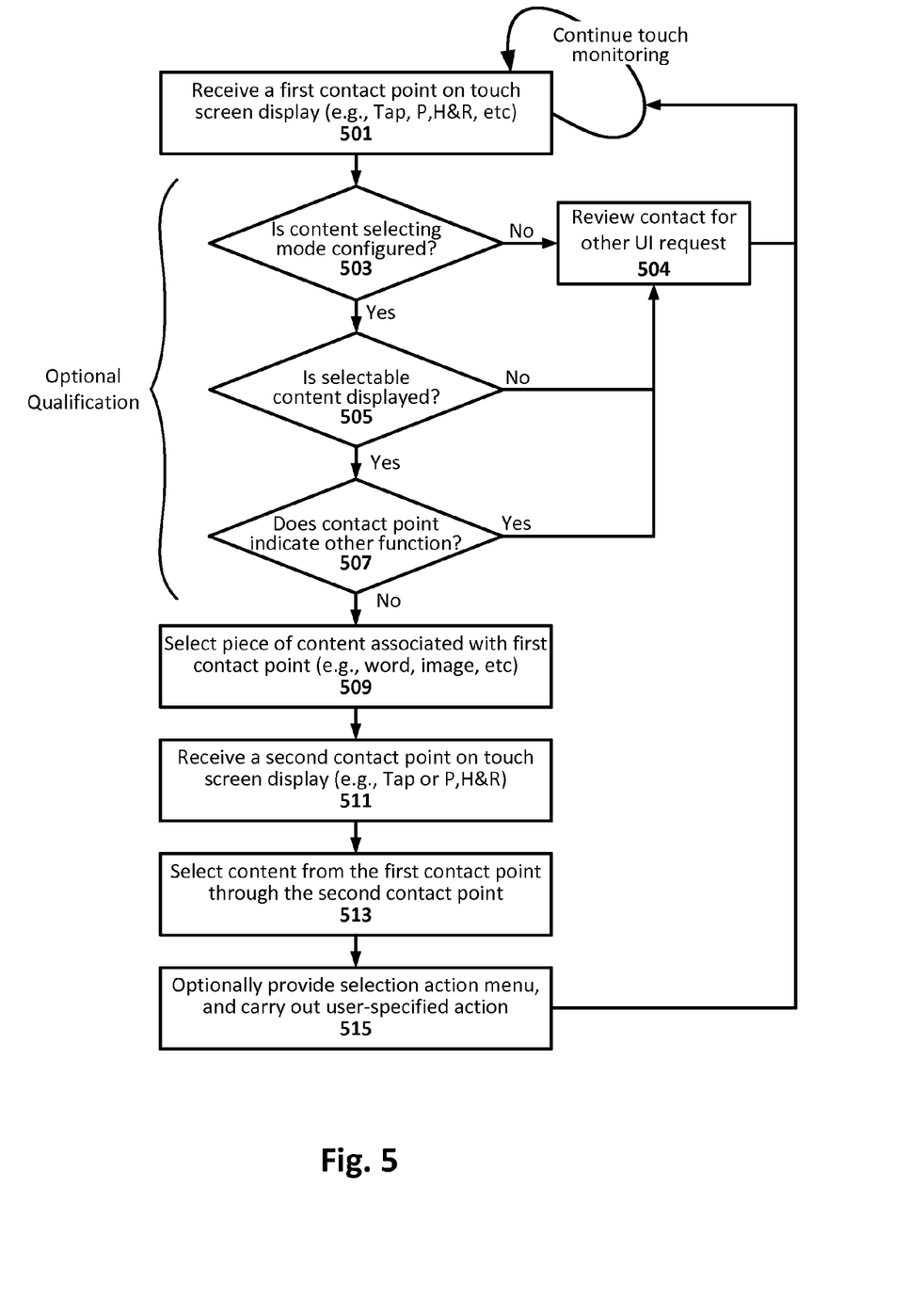
FIG. 5 illustrates a method for providing a content selecting mode in an electronic touch screen device, in accordance with an embodiment of the present invention.

FIG. 5 illustrates a method for providing a content selecting mode in an electronic touch sensitive screen device, in accordance with an embodiment of the present invention. This example methodology may be implemented, for instance, by the UI module of the example touch screen device shown in FIG. 2a, or the example touch screen device shown in FIG. 2b (e.g., with the UI provisioned to the client by the server). To this end, the UI can be implemented in software, hardware, firmware, or any combination thereof, as will be appreciated in light of this disclosure.

As can be seen, the method generally includes sensing a user's input by a touch screen display. As soon as the user begins to swipe, drag or otherwise move a contact point, the UI code (and/or hardware) can assume a drag/move gesture has been engaged and track the path of the contact point with respect to any fixed point within the touch screen until the user stops engaging the touch screen surface. The release point can also be captured by the UI as it may be used to commit the action started when the user pressed on the touch sensitive screen. In a similar fashion, if the user releases hold without moving the contact point, a tap or press or press-and-hold command may be assumed depending on the amount of time the user was continually pressing on the touch sensitive screen. These main detections can be used in various ways to implement UI functionality, including a content selecting mode as variously described herein, as will be appreciated in light of this disclosure.

In this example case, the method includes receiving 501 a first contact point at the touch screen interface. In general, the touch monitoring is effectively continuous. The method may continue with some optional qualification processing, which may be helpful to distinguish one type of contact from another type. Thus, in this example, the method continues with determining 503 if the content selecting mode is configured. As previously explained, the selecting mode may be always enabled and configured from the factory in some embodiments, while other embodiments may be configured and/or enabled by the user. To this end, the determination at 503 ensures that the content selecting mode is a possible option for the contact just received.

In any case, if the content selecting mode is not enabled or otherwise available for whatever reason, then the method may continue with reviewing 504 the contact for some other UI request (e.g., select a file, send an email, etc). On the other hand, if the content selecting mode is enabled and available, the method continues with determining 505 if selectable content is currently being displayed. If not, then it is not likely that the content selecting mode is desired, so the method may again continue with reviewing 504 the contact for some other UI request. However, if selectable content is currently being displayed, then the method may continue with determining 507 if the first contact point indicates some other function is desired. If so (e.g., based on specificity of contact), then the method may again continue with reviewing 504 the contact for some other UI request.

If the first contact point doesn't indicate some other function is desired, then it may be assumed that the content selecting mode is desired. As will be appreciated, other embodiments may not include the qualification processes at 503, 504, 505, and 507. In this example embodiment shown in FIG. 5, the post-qualification method continues with selecting 509 the piece of content associated with the first contact point (e.g., word, image, etc). As previously explained, a centroiding process may be executed in real-time to assist in determining the piece of content to select, in accordance with some such example embodiments.

The method continues with receiving 511 a second contact point on touch screen display. Recall that the first contact point received at 501 and the second contact point received at 511 may each include one or more touch points, and may each be one of the examples included in Table 1, for instance, in accordance with an embodiment. Further note that the first contact point may be one type of gesture/touch, and the second contact point may be another type of gesture/touch (they need not be the same). In still other example embodiments, each of the first and second contact points is a press-hold-and-release that lasts about 1 to 3 seconds, but longer or otherwise more complex touches can be used to uniquely identify the mode, if so desired.

The method continues with selecting 513 content from the first contact point through the second contact point. In some embodiments, this selecting may occur as soon as the second contact point is applied, while in other embodiments the selecting occurs after the second contact point is applied and released. In a more general sense, the selecting can be applied or otherwise indicated at any point after the user selection becomes apparent. The method may further include optionally providing 515 a selection action menu, so as to facilitate the user carrying out a particular action (e.g., copying, etc).

The method may continue in the touch monitoring mode indefinitely or as otherwise desired, so that any contact provided by the user can be evaluated for use in the content selecting mode if appropriate. As previously indicated, the content selecting mode can be exited by, for example, the user pressing a release mode UI feature such as the home button or a touch screen feature.

Numerous variations and configurations will be apparent in light of this disclosure. For example, one example embodiment provides a device that includes a touch screen display for displaying content to a user and allowing user input, and a user interface including a content selecting mode that can be activated in response to user contact via the touch screen display, the user contact including a first touch and release contact point targeting a first piece of displayed content and a second touch and release contact point targeting a second piece of displayed content, wherein the content selecting mode is configured to cause all content between the first and second pieces of content to be selected. In some cases, the selected content may traverse one or more page breaks. In some cases, the content selecting mode is further configured to provide a selection action user interface feature to be displayed to the user, the selection action user interface feature being executable on the selected content. In some cases, the first and second pieces of content are included in the selected content. In some cases, the first and second touch and release contact points are associated with a hold-time that is user-configurable. In some cases, the content selecting mode is further configured to cause a selection page count to be displayed on each selected page of the content when multiple pages are selected, the selection page count corresponding to the number of pages included in the selected content and starting at page one. In some cases, the content selecting mode is further configured to cause the first piece of displayed content to be highlighted upon release of the first touch and release contact point. In some cases, the selected content remains selected until the content selecting mode is affirmatively terminated. In some cases, the first touch and release contact point includes a first gesture and the second touch and release contact point includes a second gesture that is different from the first gesture. In some cases, at least one of the first and second touch and release contact points include a circular and/or diagonal gesture. In some cases, the device is an eReader device or a tablet computer or a smartphone.

Another example embodiment of the present invention provides a mobile electronic device. The device includes a touch screen display for displaying content to a user and allowing user input, and a user interface including a content selecting mode that can be activated in response to user contact via the touch screen display, the user contact including a first touch and release contact point targeting a first piece of displayed content and a second touch and release contact point targeting a second piece of displayed content, wherein the content selecting mode is configured to cause all content from the first piece of content to the second piece of content to be selected, and the selected content may traverse one or more page breaks. The content selecting mode is further configured to cause the first piece of displayed content to be highlighted upon release of the first touch and release contact point. In some cases, the content selecting mode is further configured to provide a selection action user interface feature to be displayed to the user, the selection action user interface feature being executable on the selected content. In some cases, the first and second touch and release contact points are associated with a hold-time that is user-configurable. In some cases, the content selecting mode is further configured to cause a selection page count to be displayed on each selected page of the content when multiple pages are selected, the selection page count corresponding to the number of pages included in the selected content and starting at page one. In some cases, at least one of the first and second touch and release contact points include a circular and/or diagonal gesture (or other such motioning gesture).

Another example embodiment of the present invention provides a computer readable medium encoded with instructions that when executed by one or more processors, cause a content selecting process to be carried out. The process includes, in response to user contact via a touch sensitive display device, activating a content selecting mode in the device, the user contact including a first touch and release contact point targeting a first piece of displayed content and a second touch and release contact point targeting a second piece of displayed content. The process further includes selecting all content between the first and second pieces of content. In some example such cases, the selected content may traverse one or more page breaks. In some cases, the content selecting process further includes causing a selection page count to be displayed on each selected page of the content when multiple pages are selected, the selection page count corresponding to the number of pages included in the selected content and starting at page one. In some cases, the content selecting process further includes causing the first piece of displayed content to be highlighted upon release of the first touch and release contact point.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A device, comprising:
    a touch screen display for displaying content to a user and allowing user input; and
    a user interface including a content selecting mode that can be activated in response to user contact via the touch screen display, the user contact including a first touch and release contact point targeting a first piece of displayed content and a second touch and release contact point targeting a second piece of displayed content, wherein the content selecting mode is configured to cause all content between the first and second pieces of content to be selected, and wherein the content selecting mode is further configured to assign each page of the selection with a selection page count commencing from one and sequentially increasing by one for each subsequent page in the selection, such that the first page of the selection is identified as page 1, and wherein the content selecting mode is further configured to cause each page of the selection to be displayed with the corresponding page number assigned by the content selecting mode, and wherein the selection page count assigned to and displayed on each page is in addition to original page numbering also displayed on each page of the selection, and wherein the first touch and release contact point can be anywhere on the displayed content as selected by the user.

2. The device of claim 1 wherein the selected content may traverse one or more page breaks.

3. The device of claim 1 wherein the content selecting mode is further configured to provide a selection action user interface feature to be displayed to the user, the selection action user interface feature being executable on the selected content.

4. The device of claim 1 wherein the first and second touch and release contact points are associated with a hold-time that is user-configurable.

5. The device of claim 1 wherein selection page count assigned to and displayed on each page further includes the total number of selected pages.

6. The device of claim 1 wherein the content selecting mode is further configured to cause the first piece of displayed content to be highlighted upon release of the first touch and release contact point.

7. The device of claim 1 wherein the selected content remains selected until the content selecting mode is affirmatively terminated.

8. The device of claim 1 wherein the first touch and release contact point includes a first gesture and the second touch and release contact point includes a second gesture that is different from the first gesture.

9. The device of claim 1 wherein at least one of the first and second touch and release contact points include a circular and/or diagonal gesture.

10. The device of claim 1 wherein the device is an eReader device or a tablet computer or a smartphone.

11. A mobile electronic device, comprising:
    a touch screen display for displaying content to a user and allowing user input; and
    a user interface including a content selecting mode that can be activated in response to user contact via the touch screen display, the user contact including a first touch and release contact point targeting a first piece of displayed content and a second touch and release contact point targeting a second piece of displayed content, wherein the content selecting mode is configured to cause all content from the first piece of content to the second piece of content to be selected, and the selected content may traverse one or more page breaks;
    wherein the content selecting mode is further configured to cause the first piece of displayed content to be highlighted upon release of the first touch and release contact point, and wherein the content selecting mode is further configured to assign each page of the selection with a selection page count commencing from one and sequentially increasing by one for each subsequent page in the selection, such that the first page of the selection is identified as page 1, and wherein the content selecting mode is further configured to cause each page of the selection to be displayed with the corresponding page number assigned by the content selecting mode, and wherein the selection page count assigned to and displayed on each page is in addition to original page numbering also displayed on each page of the selection, and wherein the first touch and release contact point can be anywhere on the displayed content as selected by the user.

12. The device of claim 11 wherein the content selecting mode is further configured to provide a selection action user interface feature to be displayed to the user, the selection action user interface feature being executable on the selected content.

13. The device of claim 11 wherein the first and second touch and release contact points are associated with a hold-time that is user-configurable.

14. The device of claim 11 wherein selection page count assigned to and displayed on each page further includes the total number of selected pages.

15. The device of claim 11 wherein at least one of the first and second touch and release contact points include a circular and/or diagonal gesture.

16. A non-transient computer readable medium encoded with instructions that when executed by one or more processors, cause a content selecting process to be carried out, the process comprising:
    in response to user contact via a touch sensitive display device, activating a content selecting mode in the device, the user contact including a first touch and release contact point targeting a first piece of displayed content and a second touch and release contact point targeting a second piece of displayed content; and selecting all content between the first and second pieces of content, and wherein the content selecting mode is further configured to assign each page of the selection with a selection page count commencing from one and sequentially increasing by one for each subsequent page in the selection, such that the first page of the selection is identified as page 1, and wherein the content selecting mode is further configured to cause each page of the selection to be displayed with the corresponding page number assigned by the content selecting mode, and wherein the selection page count assigned to and displayed on each page is in addition to original page numbering also displayed on each page of the selection, and wherein the first touch and release contact point can be anywhere on the displayed content as selected by a user.

17. The computer readable medium of claim 16 wherein the selected content may traverse one or more page breaks.

18. The computer readable medium of claim 16 wherein the selection page count assigned to and displayed on each page further includes the total number of selected pages.

19. The computer readable medium of claim 16 wherein the content selecting process further includes causing the first piece of displayed content to be highlighted upon release of the first touch and release contact point.

\* \* \* \* \*